United States Patent [19]

Gygli

[11] 4,041,704

[45] Aug. 16, 1977

[54] STOP MECHANISM FOR A BENDING PRESS, PLATE SHEAR OR THE LIKE MACHINES

[75] Inventor: Walter Gygli, Niederbipp, Switzerland

[73] Assignee: Haemmerle, A. G. Maschinenfabrih, Zofinger, Switzerland

[21] Appl. No.: 688,279

[22] Filed: May 20, 1976

[30] Foreign Application Priority Data

June 18, 1975 Austria .................................. 4728/75

[51] Int. Cl.² ............................................. F15B 15/18
[52] U.S. Cl. ........................................ 60/473; 60/476; 91/1; 92/13
[58] Field of Search ............... 60/473, 476; 91/1, 136, 91/35, 36; 92/13, 15, 16, 28

[56] References Cited

U.S. PATENT DOCUMENTS

| | | | |
|---|---|---|---|
| 2,016,727 | 10/1935 | Roth | 91/1 X |
| 2,202,836 | 6/1940 | Coupland | 60/473 |
| 2,613,703 | 10/1952 | Calvert | 91/35 UX |

*Primary Examiner*—Edgar W. Geoghegan

[57] ABSTRACT

A stop mechanism for a bending press, plate shear or the like machine, provided with a work-table and with a work-piece stop which is horizontally adjustable along the work table thereby defining the position of the work-piece relative to the machinery, the work-piece stop being coupled with a position control-unit which is provided with an indicator of the momentary position of the work-piece stop and can be programmed with the desired position, the stop being displaceable by means of a hydraulic piston-cylinder unit and a pump drive means controlled by the position control-unit.

3 Claims, 1 Drawing Figure

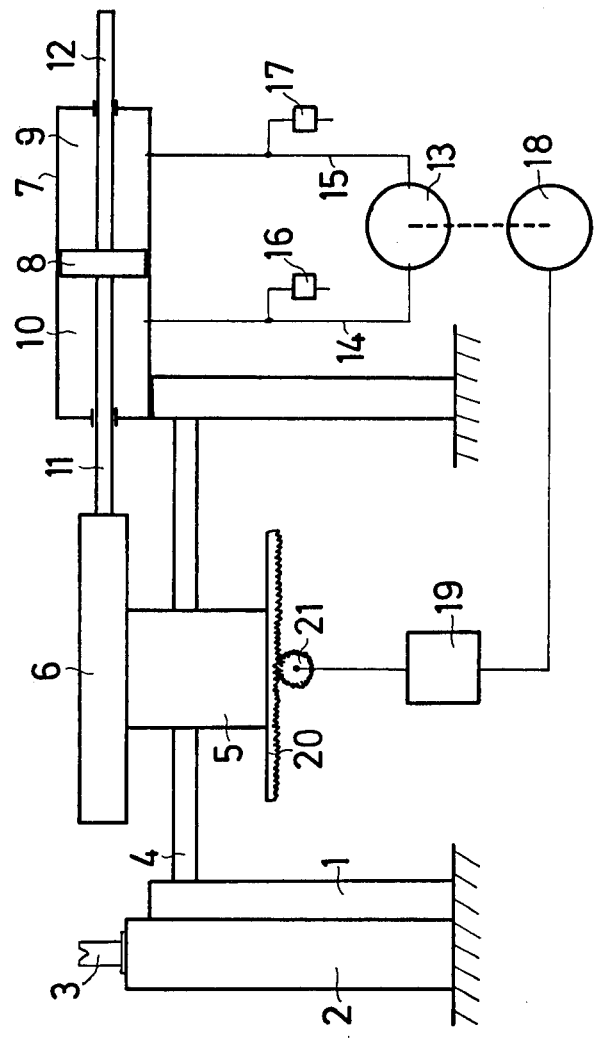

STOP MECHANISM FOR A BENDING PRESS, PLATE SHEAR OR THE LIKE MACHINES

CROSS REFERENCE TO RELATED APPLICATIONS

Applicant hereby makes cross-reference to Austrian Patent Application No. 4728/75, filed June 18, 1975, and claims Priority under the provisions of 35 USC 119.

BACKGROUND OF THE INVENTION

1. FIELD OF THE INVENTION

The present invention relates to a stop mechanism for a bending press, plate shear or similar machines provided with a work table arranged between two vertical side-walls.

2. DESCRIPTION OF THE PRIOR ART

Plate shears are often provided in bending presses, plate shear presses and like machines with a rear stop having a stationary adjustable position which allows cutting a succession of metal sheets of a same size in a much speedier manner than by marking on an outline. As a matter of fact, it is sufficient to engage the edges of the metal sheet against the rear stop so as to obtain a cutting at the proper location, this cutting step occurring obviously after said stop has been positioned accurately.

Several stop mechanisms have already been suggested, which are well suited for the processing of multiple cranked profiles or for cutting of metal sheets of a predefined, variable width. For example, applicant himself has already suggested to position the stop mechanism automatically, especially in the case of mass production, and in this case automatic positioning is obtained by means of several superposed stop devices, which can be variably adjusted, according to the given distances during the processing, the aforesaid stop devices interact with another subsidiary stop device which is attached to the main stop device on the work table. Another simplification was achieved by an arrangement, where the positioning of the stop mechanism is achieved by hydraulic or pneumatic drive means which are controlled by a position indicator. The drive means for the superposed stop devices, forms a servo control together with the position indicator, and this servo control cooperates with a numerically controlled positioning device which interacts with a feeler on the position indicator.

OBJECT OF THE INVENTION

It is an object of present invention to achieve an appreciable simplification of the aforesaid superposed stop device cooperating with a servo control arrangement.

SUMMARY OF THE INVENTION

According to the invention, the afore mentioned work-piece stop mechanism is coupled with a position-control-unit which indicates the actual position of the stop and is programmable with the desired position, a hydraulic piston-cylinder unit being provided, which unit is connected to the work-piece stop mechanism and serves for the positioning of said work-piece stop mechanism, whereby the drive means of the piston-cylinder unit is controlled by the position-control-unit.

Preferably, the hydraulic piston-cylinder unit is equipped with a double-acting piston which can be actively displaced in its two opposite directions, whereby both cylinder volumes are connected to a hydraulical pump with separate pipes, the pump in turn being connected to the control unit.

BRIEF DESCRIPTION OF THE DRAWING

The invention will now be described by way of example, with reference to the accompanying drawing, in which there are schematically shown the important parts of the machine.

Referring now to the drawings in which 1 designates a frame supporting a work table 2, disposed between two vertical walls (not shown) and with a tool 3 for the manufacturing of multiple cranked profiles. The frame 1 is provided with two parallel guides one guide 4, only one of which is shown on the drawing, guiding a carriage 5. The carriage 5 is provided with a work-piece stop-device 6 which can be displaced by hydraulic drive means. This hydraulic drive means comprises a hydraulic cylinder 7 housing a double-acting piston 8 which separates the cylinder into two chambers 9 and 10. The piston 8 is provided with a through-piston rod 11, 12 which extends beyond the two face-sides of the hydraulic cylinder 7 and which on one side is fixed to the stop 6.

The hydraulic cylinder 7 is connected to a pump 13, which pump can be rotated in either direction, whereby one side of the pump is connected to the chamber 10 of the hydraulic cylinder by means of pipe 14, whereas the other side of the pump is connected to the chamber 9 by means of pipe 15. The pipes are preferrably equipped with overpressure release valves 16, 17. The motor 18 drives the pump 13 and the motor is controlled by a position-control unit 19. This control unit, which itself is already known, is provided with a device for the indication of the actual position of the carriage 5, thereby also indicating the actual position of the work-piece stop 6 and is equipped with a toothed rod 20 and a counter 21.

The pump 13 delivers the amount of pressurized oil which is necessary for the displacement of the work-piece stop 6, the amount of oil being determined as a function of the difference of the actual and the desired position. A position preselector for the purpose of locating the stop 6 is provided and can be adjusted according to the desired position of the work-piece stop 6. The position-preselector serves as a control unit and determines the momentary difference between the actual position and the valve as set by the preselector. The achieved precision is very high and the time it takes for new adjustment of the preselector is very short. In addition to that, it is easily possible to provide an electronic digital display of the actual position of the work-piece stop. A slight overpressure in the hydraulic system is preferred in order to produce the desired high precision level for the desired adjustment.

What we claim is:

1. A stop mechanism for a bending press, plate shearing press or like machine in combination with a work-table and with a work-piece stop which is horizontally adjustable along the work-table thereby defining the position of the work-piece relative to the bending or shearing machine comprising:
    an adjustable position-preselector serving as a position control-unit coupled with said work-piece stop to determine the momentary difference between the actual position and the value set by the preselector;

an indicator of the momentary position of the workpiece stop which is mounted on said position control-unit;

programming means for programming said position control-unit in a desired position;

a hydraulic piston-cylinder unit having hydraulic drive means;

said piston-cylinder unit having one cylinder with a chamber on each side of said piston which can be displaced in two opposite directions, the displacement of said piston in one of said directions displacing said stop in that direction and the displacement of said piston in the other direction displacing said stop in the other direction;

said hydraulic drive means comprising a pump and separate pipes from said pump to each of the chambers on each side of the piston so that the driving of said pump is controlled by said position control unit coupled with said work-piece stop under a slight over pressure of the hydraulic fluid.

2. A stop mechanism according to claim 1, in which said work-piece stop is directly connected to one end of the piston by means of a piston rod which is located in the hydraulic cylinder.

3. A stop mechanism according to claim 1, in which there is provided a toothed rod fixed to the workpiece stop and in which there is further provided a mechanically coupled counter, said counter being activated by said toothed rod to provide the input signal to the position preselector.